US010430793B2

(12) United States Patent
Canis et al.

(10) Patent No.: US 10,430,793 B2
(45) Date of Patent: Oct. 1, 2019

(54) FRAUD MANAGEMENT SYSTEM AND METHOD

(71) Applicant: Amadeus SAS, Biot (FR)

(72) Inventors: Laure Canis, Nice (FR); Cedric Florimond, Valbonne (FR); Simone Bisogni, Antibes (FR); Marion Bonnet, Palaiseau (FR)

(73) Assignee: AMADEUS S.A.S., Biot (FR)

( * ) Notice: Subject to any disclaimer, the term of this patent is extended or adjusted under 35 U.S.C. 154(b) by 709 days.

(21) Appl. No.: 13/940,417

(22) Filed: Jul. 12, 2013

(65) Prior Publication Data
US 2015/0019410 A1    Jan. 15, 2015

(51) Int. Cl.
    *G06Q 40/00*    (2012.01)
    *G06Q 20/40*    (2012.01)

(52) U.S. Cl.
    CPC ............... *G06Q 20/4016* (2013.01)

(58) Field of Classification Search
CPC ................................................. G06Q 20/4016
USPC .............................. 705/35, 39; 707/1; 726/1
See application file for complete search history.

(56) References Cited

U.S. PATENT DOCUMENTS

| 7,263,506 B2 | 8/2007 | Lee et al. |
| 7,774,842 B2 | 8/2010 | Mahone et al. |
| 7,778,906 B2 * | 8/2010 | Koukis ............ 705/35 |
| 8,078,515 B2 | 12/2011 | John |
| 2005/0149759 A1 | 7/2005 | Vishwanath et al. |
| 2006/0080281 A1 * | 4/2006 | Bongiorno et al. ....... 707/1 |
| 2012/0158540 A1 | 6/2012 | Ganti et al. |
| 2014/0282856 A1 * | 9/2014 | Duke et al. ....... 726/1 |

FOREIGN PATENT DOCUMENTS

| WO | 200207058 A1 | 1/2002 |
| WO | WO 2008144628 | 5/2008 |

OTHER PUBLICATIONS

European Patent Office, search report issued in Application No. 13290165.3 dated Dec. 10, 2013.
http://www.fraudscreening.com/ROICalculator.html, Fraud Screening, website.

* cited by examiner

Primary Examiner — Samica L Norman
(74) Attorney, Agent, or Firm — Thompson Hine LLP (57) ABSTRACT

The present invention relates to a computer-implemented fraud method and system for managing fraud screening in response to a requested transaction. The fraud management system checks the efficiency of the fraud screening strategy and predicts the efficiency of new fraud screening strategies based on the total cost of fraud. This calculation is facilitated, because transactions are divided into groups, and the total cost of fraud may be calculated for a representative element of the group, and not for each transaction in the group. Furthermore, if the fraud screening is based on rules that apply an acceptance flow to predetermined conditions, the fraud management can choose the best acceptance flow for these predetermined conditions by minimizing the total cost of fraud. Finally, the fraud management can also flag inefficient rules thanks to an indicator related to the total cost of fraud to highlight rules whose predetermined conditions should be changed.

14 Claims, 3 Drawing Sheets

FRAUD MANAGEMENT SYSTEM AND METHOD

CROSS REFERENCE TO RELATED APPLICATIONS

This application is related to co-pending application Ser. No. 13/786,497 titled "Fraud Decision Processing System and Method", the content of which is incorporated by reference in its entirety.

TECHNICAL FIELD

The present invention relates to a method and a system to perform fraud screening for any type of transaction request.

BACKGROUND

Merchants need to reduce the number of fraudulent transactions because when a fraud occurs, they are responsible for reimbursing the amounts of fraudulent transactions to the real credit card holder. Thus, a payment system performs a fraud screening to reduce fraud. Based on transaction information such as the amount of the transaction, location of the sale, IP address of the requesting device (for an online payment), whether the credit card is on a black list and even data on repeated transactions with the same credit card number, email, or name (velocity checks), the fraud screening service provider may deny the requested transaction, allow the requested transaction, or direct the requester for manual review. For a manual review, the system waits for additional information.

In an example of airline ticket purchase, the transaction information may further include the origin, destination, and time before departure.

Usually the rules of the fraud screening system are adjusted ad-hoc, based on disparate data such as the rates of false negatives, false positives, and manual review. We propose a way to evaluate a posteriori and a priori the efficiency of a fraud screening strategy based on the calculation of the expected total costs of fraud, and provide recommendations on how to adjust this strategy.

The total costs of fraud includes cost of false negatives (which may include ticket reimbursement and chargeback processing), cost of false positives (which may include lost sales), and other fraud related costs (which may include challenge processing and cost of a fraud screening engine, and even merchant fees). Currently, this total costs of fraud contains uncertainty and is difficult to assess.

SUMMARY

In general, a method and system for computer-implemented fraud management system is provided. The fraud management system may monitor the efficiency of a given fraud screening strategy, predict the efficiency of a new fraud screening strategy and compare strategies, identify fraud screening strategies' least efficient rules, and may complete the associated computations to provide these results with a minimal response time to user requests. The user may then choose to directly apply a recommended fraud screening strategy and/or redefine rules that have been flagged by the system as least efficient. This is particularly relevant to large merchants who spend a significant number of resources dedicated to their fraud management, and in the travel industry, where large amounts are at stake.

The system may define a total cost of fraud measure based on user inputs and historical data. Based on this measure, the system may facilitate the monitoring of the efficiency of an existing fraud management strategy, and predicting the efficiency of new fraud management strategies by identifying fraud management strategies' least efficient rules.

The system may provide a process for minimizing response time by pre-sorting transactions into groups, performing minimization of total costs of fraud calculations, and sampling fraud screening requests to improve speed of calculation while maintaining precision. For this purpose, the fraud management system may create an expected total costs of fraud calculation engine, which may deal with current state of knowledge and uncertainties based on historical data and user input.

In one aspect, in order to ensure minimal response time to user requests, the total costs of fraud may not be calculated for each of the requested transactions. The requested transactions may be grouped into a plurality of groups of requested transactions, and the total costs of fraud may be calculated for one of the group of requested transactions. The requested transactions may be grouped based on transaction information. The transaction information may include a value of the requested transaction and/or a date of the requested transaction. If the user request is to monitor the performance of an old strategy, the requested transactions may be grouped based on one of the following criteria: the number of fraud screens performed, a number of payment instrument authentications performed, whether a challenge with manual review was performed, the date of the request, the range of ticket amount, whether the requested transaction was allowed. If the user request is to predict the performance of a new strategy, the requested transactions may be grouped also depending on the acceptance flows to be tested.

In another aspect, if the user request is to predict the performance of a new strategy, there may be a sampling of the fraud screenings. Eventually all fraud screenings will be performed, but at a given point in time, the performed fraud screenings will be split across groups according to their sizes.

In another aspect, the computer-implemented fraud management system may determine the optimal acceptance flow for a set of transactions verifying certain conditions. The system may therefore modify a fraud screening rule by changing the acceptance flow corresponding to this rule. The acceptance flow may include one of the following, accepting the requested transaction, rejecting the requested transaction, and challenging the requested transaction. The acceptance flow may also include performing a payment instruction authentication before making a final decision.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The details of one or more embodiments are set forth in the following detailed description of the invention and the accompanying drawings. Other objectives, features, and advantages of the invention will be more readily understood upon consideration of the following Detailed Description of the invention, taken in conjunction with the accompanying drawings, and with the claims.

DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF EXEMPLARY EMBODIMENTS

A detailed explanation of the system and method according to the preferred embodiments of the present invention are described below.

The embodiments may take the form of a hardware embodiment, a software embodiment, or an embodiment combining software and hardware. In one embodiment, the computer-implemented fraud management system may take the form of a computer-program product that includes computer-useable instructions embodied on one or more computer-readable media.

The various fraud management systems and methods described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere in this document. Various computer-based systems, methods and implementations in accordance with the described technology are presented below.

Figure 1:
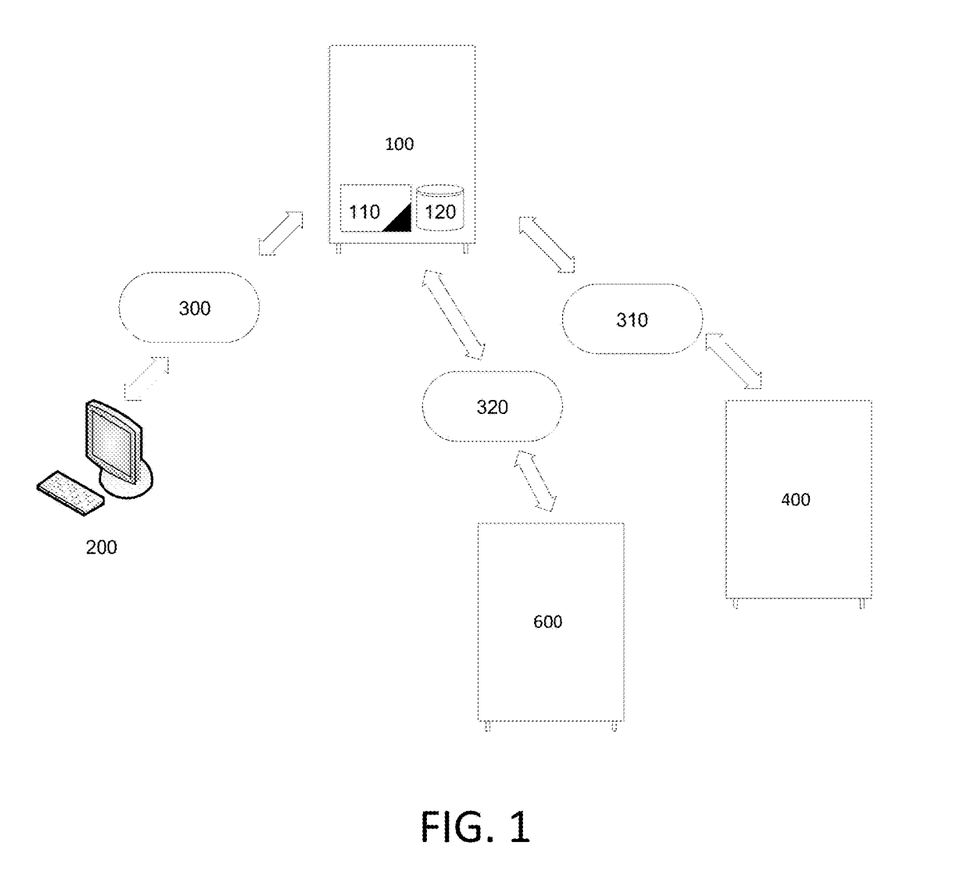
FIG. 1 illustrates a computer-implemented fraud management system.

FIG. 1 is an embodiment of a fraud management system. The system may calculate, store, and update a total costs of fraud database, and may apply fraud management rules and flows based in part on the total costs of fraud database.

Referring to the computer-implemented fraud management system of FIG. 1, the server 100, the client device, which may be a terminal 200, and the processor 110, may include a general-purpose computer and can have an internal or external memory for storing data and programs such as an operating system (e.g., DOS, Windows 2000™, Windows XP™, Windows NT™, OS/2, UNIX or Linux) and one or more application programs. Examples of application programs include computer programs implementing the techniques described herein for lyric and multimedia customization, authoring applications (e.g., word processing programs, database programs, spreadsheet programs, or graphics programs) capable of generating documents or other electronic content; client applications (e.g., an Internet Service Provider (ISP) client, an email client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, in another embodiment, application programs can be externally stored in or performed by one or more device(s) external to the general-purpose computer.

In addition, client device, which may be a terminal 200, may be or can include a desktop computer, a server, a laptop computer or other mobile computing device, a network-enabled cellular telephone (with or without media capturing/playback capabilities), wireless email client, or other client, machine or device to perform various tasks including Web browsing, search, electronic mail (email) and other tasks, applications and functions.

The general-purpose computer may include a central processing unit (CPU) for executing instructions in response to commands, and a communication device for sending and receiving data. One example of the communication device is a modem. Other examples include a transceiver, a communication card, a satellite dish, an antenna, a network adapter, or some other mechanism capable of transmitting and receiving data over a communications link through a wired or wireless data pathway.

The general-purpose computer may also include an input/output interface that enables wired or wireless connection to various peripheral devices. Examples of peripheral devices include, but are not limited to, a mouse, a mobile phone, a personal digital assistant (PDA), a keyboard, a display monitor with or without a touch screen input, and an audiovisual input device. In another implementation, the peripheral devices may themselves include the functionality of the general-purpose computer. For example, the mobile phone or the PDA may include computing and networking capabilities and function as a general purpose computer by accessing a network and communicating with other computer systems. Examples of a network, such as network 300, include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more networks.

In one implementation, a processor-based system of the general-purpose computer may include a main memory, preferably random access memory (RAM), and can also include a secondary memory, which may be a tangible computer-readable medium 120. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the secondary memory may include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or PROM) and associated socket, and other removable storage units and interfaces, which allow software and data to be transferred from the removable storage unit to the computer system.

Referring to FIG. 1, network 300 (also 310 and 320) may also include a communications interface that allows software and data to be transferred between terminal 200, server 100, and the other components shown in system 100. The system components may also be stand-alone components that can communicate with each other, a centralized server 100, and/or the client device over network 300. Examples of communications interfaces can include a modem, a network interface (such as, for example, an Ethernet card), a communications port, and a PCMCIA slot and card. Software and data transferred via a communications interface may be in the form of signals, which can be electronic, electromagnetic, optical or other signals capable of being received by a communications interface. These signals may be provided to a communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer readable medium" are generally used to refer to media such as a removable storage device, a disk capable of installation in a disk drive, and signals on a channel. These computer program products may provide software or program instructions to a computer system.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media include computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Computer programs may be associated with applications and may be stored in the main memory or secondary memory. Such computer programs can also be received via a communications interface. Such computer programs, when executed, may enable the computer system to perform the features as discussed herein. In particular, the computer programs, when executed, may enable the processor to perform the described techniques. Accordingly, such computer programs may represent controllers of the computer system.

In an embodiment where the elements are implemented using software, the software may be stored in, or transmitted via, a computer program product and loaded into a computer system using, for example, a removable storage drive, hard drive or communications interface. The control logic (software), when executed by the processor, may cause the processor to perform the functions of the techniques described herein.

In another embodiment, the elements may be implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements may be implanted using a combination of both hardware and software.

Referring to FIG. 1, the computer-based methods can be accessed or implemented over the World Wide Web by providing access via a Web Page to the methods described herein. Accordingly, the Web Page may be identified by a Universal Resource Locator (URL). The URL may denote both a server and a particular file or page on the server. In this embodiment, it is envisioned that a client computer system, which may be the client device 106, may interact with a browser to select a particular URL, which in turn may cause the browser to send a request for that URL or page to the server identified in the URL. Typically, the server may respond to the request by retrieving the requested page and transmitting the data for that page back to the requesting client computer system, which may be the client device 106 (the client/server interaction may be typically performed in accordance with the hypertext transport protocol or HTTP). The selected page may then be displayed to the user on the client's display screen. The client can then cause the server containing a computer program to launch an application, for example, to perform an analysis according to the described techniques. In another implementation, the server can download an application to be run on the client to perform an analysis according to the described techniques.

Referring to FIG. 1, a payment server 100, which may incorporate a fraud management engine, may include a processor 110 and a tangible computer-readable medium 120, such as a disk drive or a flash memory system. The tangible computer-readable medium 120 stores programming which directs the processor and the payment server 100 to perform functions discussed below. The server 100 communicates with a terminal 200 via, e.g., a network 300. The network 300 may be, e.g., the internet. The network 300 may also be a proprietary or local network. The payment server 100, by the operation of the processor 110 and tangible computer-readable medium 120, receives request for a transaction (e.g., buying an airline ticket) and transaction information from the terminal 200 via the network 300. The terminal 200 may be, e.g., a merchant terminal (e.g. airline sales terminal) or a merchant's server.

The payment server 100 (incorporating the fraud management engine) may communicate with a fraud screening service provider server 400 via, e.g., a network 310. The network 310 may be, e.g., the internet a proprietary network, or a local network. Upon receiving the request for transaction, the payment server 100 performs the fraud screening, by the operation of the processor 110 and tangible computer-readable medium 120, by communicating with the fraud screening service provider 400 via the network 310. The payment server 100 may performs the fraud screening by sending the requested transaction and transaction information to the fraud screening service provider server 400, and receives a result of the fraud screening from the fraud screening service provider server 400. In another embodiment, the payment server 100 includes the fraud screening engine and performs the fraud management.

The fraud screening service provider server 400 transmits a result of the fraud screening back to the payment server 100. Based on the result, the payment server may issue to the terminal 200 a determination to allowing the requested transaction, rejecting the requested transaction, or requesting more information. In the case of gathering more information through manual review, the payment server 100 waits for additional information from the terminal 200.

Another type of information gathering is an authentication of the payment instrument, such as a credit card or debit card. An example of such authentication is the 3-D Secure® authentication protocol developed by Visa® and adopted by MasterCard®. In one implementation, a password is provided to the user for authentication. One added feature of this type of authentication is the shift in fraud cost. When the payment instrument is enrolled in the 3-D Secure® authentication program and that authentication is performed, the total costs of fraud is shifted to the issuing bank of the instrument. Thus, merchants are willing to use the 3-D Secure® authentication.

The system may include the terminal 200 communicating with an authentication service provider server 600, via a network 320. In the 3-D Secure® authentication program, the authentication service provider server 600 may be the issuing bank of the payment instrument (e.g. credit card), or a service provider contracted by the issuing bank. The network 320 may be, e.g., the internet, a proprietary, or a local network.

Figure 2:
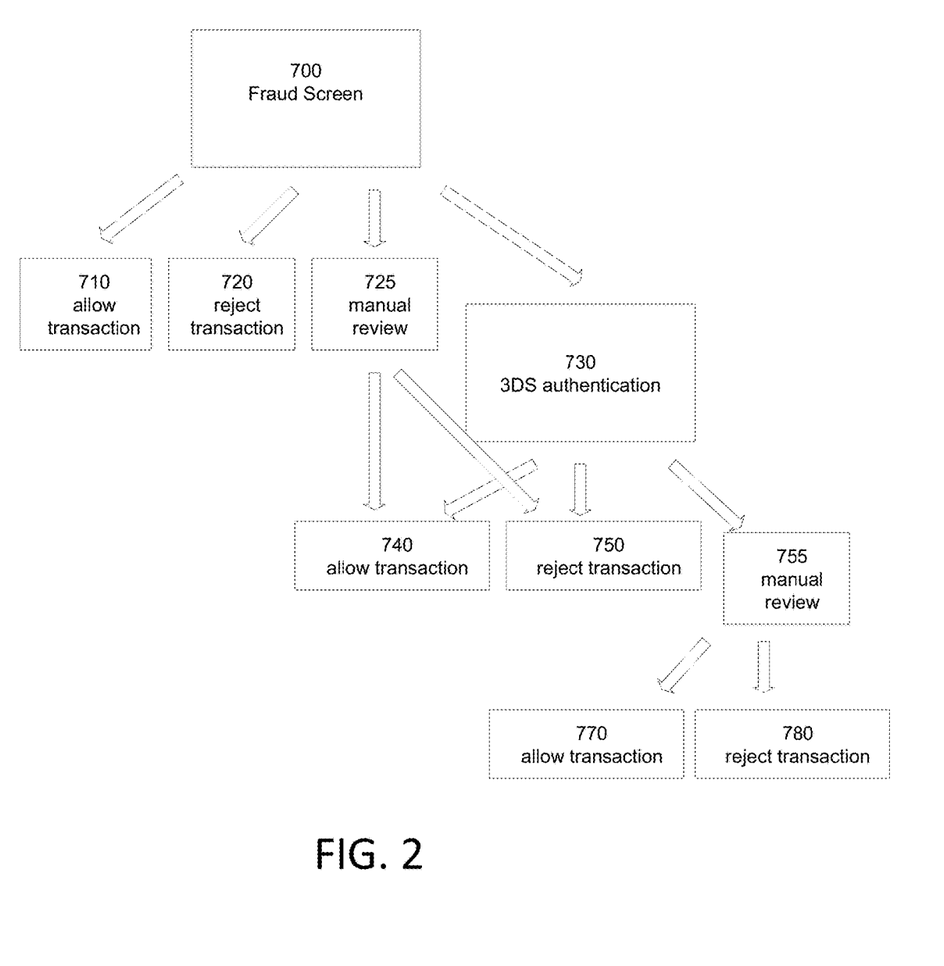
FIG. 2 illustrates an operation flow of a requested transaction using a fraud screening and a payment instrument authentication.

FIG. 2 illustrates an operation flow of a requested transaction using fraud screening and payment instrument authentication (e.g., 3D-Secure®). At 700, the system may perform the initial fraud screening. The possible operation flow of responses (i.e., ordered steps) includes allowing the transaction (710), rejecting the transaction (720), performing the 3DS authentication (730), and performing manual review (725). The fraud screening may be predictive, or the system may attribute a probability by default based on whether a transaction has been accepted or denied, before any chargeback information has been received.

As a result for of the manual review, the system may determine to allow the transaction (740) or to reject the transaction (750).

As a result of the 3DS authentication (730), the system may determine to allow the transaction (740), reject the transaction (750), or perform manual review (755). This manual review (755) may result in allowing the transaction (770) or rejecting the transaction (780).

The server 100 further includes a fraud management engine that creates, stores, and updates a total costs of fraud database to improve the fraud screening efficiency using the calculated total costs of fraud. The database may be store in the tangible computer-readable medium 120.

Fraud Screening needs to minimize false negatives (failing to detect a fraudulent transaction request) and false positives (falsely identify legitimate transaction requests as fraudulent). However it is hard to balance the two without knowing their economic impact in terms of costs.

The total costs of fraud is a unique measure to perform this balancing, which may include the following variables:

Fraud reimbursement cost: cost for the merchant of reimbursing fraudulently authorized transactions for which he is liable. In the example of purchasing an airline ticket, the fraud reimbursement cost is the ticket value.

Chargeback cost: when a chargeback is received, the merchant might spend some time processing it and inquiring on it. This time can be translated into human labor costs. Furthermore, the merchant might incur a penalty from his bank for each chargeback received, because received chargebacks also trigger manual work on the bank's end.

Challenge cost: cost of performing additional checks by manual reviews.

Lost sales: gross margin from sales that are not made because a non-fraudulent transaction is erroneously rejected times the probability that a rejected customer will not try to purchase the ticket again 3D-Secure® cost: cost of performing 3D-Secure® (e.g., a payment instrument authentication).

Fraud screening cost: cost of performing a fraud screening.

One way of calculating the total costs of fraud is by scenario. An example of a scenario includes the possible responses and elements in fraud management of a requested transaction. For example, a scenario may include whether the merchant is liable in case of fraud (2 possibilities), whether a payment instrument authentication was performed (2 possibilities), how many fraud screening were performed (3 possibilities), whether a manual review was performed (2 possibilities), whether in the end the transaction was accepted or rejected (2 possibilities), and whether the requested transaction was fraudulent (2 possibilities). Thus, there are 2×2×3×2×2×2 or 96 scenarios.

The system may calculate the total cost of fraud for a transaction for which the total cost of fraud is deterministic.

| Fraud | Final decision | Challenge with manual review | # of FS calls | # of 3DS calls | Liability |
|---|---|---|---|---|---|
| Yes: 1 | Accept: 1 | Yes: 1 | 0 | 0 | Liable: 1 |
| No: 0 | Deny: 0 | No: 0 | 1 | 1 | Not liable: 0 |
|  |  |  | 2 |  |  |

To get the total costs of fraud, the probability of a scenario may be calculated, and the sum of fraud costs per scenario may be associated with this probability.

| Fraud reimbursement | Chargeback processing | Manual review | Lost sales | Fraud screening | 3DS | Merchant fee |
|---|---|---|---|---|---|---|
| Final decision * fraud * | Final decision * fraud * | Challenge with manual | (1 − final decision) * (1 − | # of FS calls * | # of 3DS calls * | Ticket price * MSF % (function |

| Fraud reimbursement | Chargeback processing | Manual review | Lost sales | Fraud screening | 3DS | Merchant fee |
|---|---|---|---|---|---|---|
| liability * ticket price | cost of 1 chargeback | review * cost of 1 manual review | fraud) * cost of refusing 1 real transaction | cost of 1 FS call | cost of 1 3DS call | of liability, FS, strategy in general) |

The expected total costs of fraud may be generated by the summation over all scenarios of the probability multiplied by the associated total cost of fraud.

The table below shows a scenario as an entry in the total costs of fraud database (Scenario 1):

| Merchant liability | 3DS | Number of fraud screenings | Manual review | Final acceptance status | Fraudulent |
|---|---|---|---|---|---|
| Yes | No | 1 | Yes | Allow | No |

For each scenario, the total costs of fraud may be calculated by summing its individual cost components (e.g., those shown above). In the case of the scenario shown above, there will not be fraud reimbursement nor chargeback cost nor 3DS cost, there will be a manual review cost, plus one fraud screening per transaction costs. In this situation, the specific scenario is known, and the system may calculate the total cost of fraud with certainty.

However, it is often the case that we don't know for sure in which scenario we are in, and as such, the system will handle the associated uncertainty. Take the following example: one fraud screening performed by a merchant who is liable for the payment, performs a manual review, and finally decides to accept the payment. If the analysis is performed two weeks later and a chargeback hasn't been received, it is still unknown whether the payment was fraudulent, This example boils down to a mix of Scenario 1 with a certain probability (the probability that the payment is not fraudulent) and Scenario 2 with the remaining probability.

The table below shows Scenario 2:

| Merchant liability | 3DS | Number of fraud screenings | Manual review | Final acceptance status | Fraudulent |
|---|---|---|---|---|---|
| Yes | No | 1 | Yes | Allow | Yes |

Therefore, the total costs of fraud corresponding to this example can be calculated by weighting the total costs of fraud corresponding to Scenarios 1 and 2 with the right probabilities. These probabilities need to be estimated.

Figure 3:
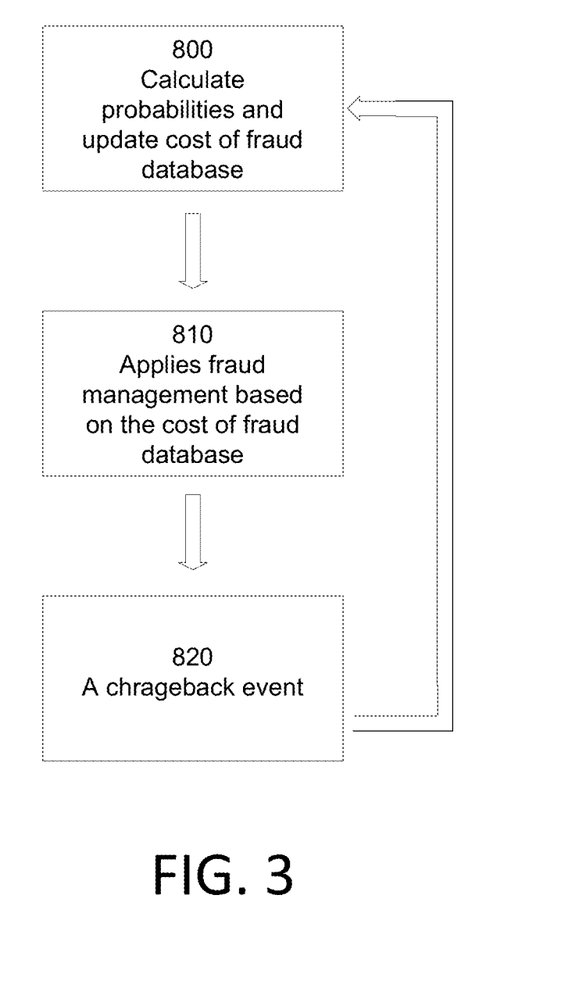
FIG. 3 illustrates a flow diagram of the process of calculating probabilities based on historical data, storing these probabilities in a database, and dynamically updating the probabilities.

For the estimation, an initial probability of fraud needs to be assessed (probability of fraud just after the acceptance decision). There are two ways to have this initial probability of fraud. Either it is an output of the fraud screening engine (the fraud screening engine may be predictive one), otherwise it can be inferred from statistics. Indeed, probabilities of fraud may be may be based on historical data stored in the total costs of fraud database corresponding to the acceptance response (e.g. payment that have been accepted have an average fraud probability of 0.5%). Moreover, the probabilities are updated dynamically. Certain events, such as a chargeback, trigger an update by updating the probability of fraud to 1. Inversely, if week after week a chargeback is still not received, the probability of fraud will converge slowly from its initial value to 0. FIG. 3 illustrates a flow diagram of the process. At 800, the fraud management server calculates probabilities and updates the total costs of fraud database. At 810, the fraud management server applies data in total cost of fraud database for fraud management. At 820, at a certain point in time, the system will evaluate whether a chargeback has taken place or not, which triggers an update of the database at 800 to calculate a probability of fraud.

Moreover, in the case of predicting the efficiency of fraud strategies to be tested, additional components in the table may be uncertain. Indeed, take the example previously mentioned: one fraud screening performed by a merchant who is liable for the payment, performs a manual review, and finally decides to accept the payment. If the user wants to predict the efficiency of a strategy which applied to this payment will perform 3DS then accept the payment if 3DS=OK and reject it if 3DS=KO, the "final acceptance status" also becomes probabilistic because we don't know upfront what would have been the 3DS result. To accommodate these additional uncertainties, some assumptions can be performed on the performance of each fraud screening or information gathering steps (false positives and false negatives of the 3DS, manual review and fraud screening processes; and the probability of manual review given fraud, manual review given not fraud).

In one embodiment, the cost of calculation is not performed for every transaction. For each scenario, the transactions are grouped, and the cost of calculation is performed for the group. For example, transactions may be divided into groups for the transaction value. Using the airline ticket example, groups may include transaction of tickets up to 50 dollars, between 50-100 dollars, between 100-150 dollars, and so forth. The total costs of fraud for a scenario for each group may be calculated by computing the total costs of fraud for one element of the group and multiplying it by the number of elements in the group.

Using such grouping, the time required for total costs of fraud calculation is reduced because it is not performed for each and every transaction.

The fraud management system may further facilitate response time optimization, as the response time of fraud screening may also be reduced utilizing the grouping of transactions. For example, fraud screening is not performed for each and every transaction. By way of sampling, fraud screenings are performed for a number of transactions in the group, but not all, and proportionately to the size of the group. The results of the sample fraud screenings are used as representative of the group.

One way of performing fraud management is by using rules. A rule, for example, is a predetermined condition and n acceptance flow when the predetermined criterion is met (i.e., if the rule is met, then perform corresponding steps). The table below shows some examples of fraud management rules in the context of an airline ticket purchase:

| Predetermined condition: | Acceptance flow: |
|---|---|
| Frequent flyer | Allow requested transaction |
| Foreign IP address not matching issuing country of credit card, and cardholder's name not on passenger's list | Reject requested transaction |
| 3D-Secure ® result passes | Allow requested transaction |
| 3D-Secure ® result does not pass | Perform fraud screening |
| 3D-Secure ® result does not pass and the ticket is business class | Reject requested transaction |
| 3D-Secure ® result does not pass and the ticket is economy class | Manual review |

Moreover, the efficiency of each rule may be calculated using the total costs of fraud calculation. One such calculation is known as key performance indicator (KPI), which is shown below using the airline ticket example:

$$KPI = \text{average gross margin \%} = \frac{\Sigma_{tx \text{ on which rule is applied}} \text{ fraud costs}}{\Sigma_{tx \text{ on which rule is applied}} \text{ ticket value}}$$

As shown, the percentage of total costs of fraud cost summed over all tickets on which a rule is applied over the sum of ticket values is calculated, and subtracted from the average gross margin percentage. This KPI represents the net gross margin expected from a transaction on which the rule is applied, by subtracting all fraud related costs percentage from the average gross margin. A higher KPI represents a more efficient rule.

Moreover, for each predetermined condition, a KPI for each acceptance flow may be calculated to determine the best flow, and improve the rule. For example, for a predetermined condition, the acceptance flow may be accept, deny, manual review, and 3D-Secure® authentication. A KPI for every acceptance flow may be calculated to create the most efficient rule.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A fraud management system comprising:
a server communicating with a terminal; and
a computer-storage medium including a plurality of instructions that, when executed by the server, cause the server to:
receive a plurality of transaction requests;
sort the transaction requests into a plurality of groups;
select a number of the transaction requests from each group to define a sample of the group that contains less than all the transaction requests in the group;
for each transaction request in each sample:
determine which rules of a plurality of rules are satisfied by the transaction request,
select an acceptance flow from a plurality of acceptance flows based on the rules satisfied by the transaction request,
calculate a total cost of fraud for the transaction request by applying the selected acceptance flow to the transaction request, and
store the total cost of fraud in a total cost of fraud database;
determine a total cost of fraud for each group based on the total costs of fraud calculated for the transaction requests in the sample of the group and stored in the total cost of fraud database; and
monitor an efficiency of the fraud management system by computing a key performance indicator for each rule based on the total costs of fraud stored in the total cost of fraud database and the value of transactions associated with the transaction requests to which the rule applied.

2. The fraud management system of claim 1 wherein each sample consists of one of the transaction requests from the corresponding group of transaction requests.

3. The fraud management system of claim 2 wherein the transaction requests are grouped based on transaction information.

4. The fraud management system of claim 3 wherein the transaction information includes at least one of a value of the transaction request or a date of the transaction request.

5. The fraud management system of claim 3 wherein the transaction requests are grouped based on at least one of the number of fraud screenings performed, the number of payment instrument authentications, whether a manual review was performed, or whether the transaction request was finally allowed.

6. The fraud management system of claim 1 wherein the instructions cause the server to calculate the total cost of fraud for each transaction request in each sample by:
identifying, from a plurality of scenarios, one or more scenarios applicable to the acceptance flow applied to the transaction request;
summing, for each of the one or more scenarios, a plurality of individual cost components for the scenario to produce a cost of fraud for the scenario;
multiplying, for each of the one or more scenarios, the cost of fraud for the scenario by a probability that the transaction request is in the scenario to produce a weighted cost of fraud for the scenario; and
summing the weighted costs of fraud of the one or more scenarios to produce the total cost of fraud for the transaction request.

7. The fraud management system of claim 6 wherein the individual cost components comprise at least one of a cost of reimbursing the transaction request if fraudulent, a chargeback cost of the transaction request if fraudulent, a cost of manual review, a cost of lost sales, a cost of performing payment authentications, a cost of fraud screenings, or a probability of the transaction request being fraudulent.

8. A fraud management method comprising:
receiving, at a server of a fraud management system, a plurality of transaction requests;
sorting, by the server, the transaction requests into a plurality of groups;

selecting, by the server, a number of the transaction requests from each group to define a sample of the group that contains less than all the transaction requests in the group;

for each transaction request in each sample;
- determining, by the server, which rules of a plurality of rules are satisfied by the transaction request,
- selecting, by the server, an acceptance flow from a plurality of acceptance flows based on the rules satisfied by the transaction request,
- calculating, by the server, a total cost of fraud for the transaction request by applying the selected acceptance flow to the transaction request, and
- storing, by the server, the total cost of fraud in a total cost of fraud database;

determining, by the server, a total cost of fraud for each group based on the total costs of fraud calculated for the transaction requests in the sample of the group and stored in the total cost of fraud database; and monitoring, by the server, an efficiency of the fraud management system by computing a key performance indicator for each rule based on the total costs of fraud stored in the total cost of fraud database and the value of the transactions associated with the transaction requests to which the rule applied.

9. The fraud management method of claim 8 wherein each sample consists of one of the transaction requests from the corresponding group of transaction requests.

10. The fraud management method of claim 9 wherein the transaction requests are grouped based on transaction information.

11. The fraud management method of claim 10 wherein the transaction information includes at least one of a value of the transaction request or a date of the transaction request.

12. The fraud management method of claim 10 wherein the transaction requests are grouped based on at least one of the number of fraud screenings performed, the number of payment instrument authentications, whether a manual review was performed, or whether the transaction request was finally allowed.

13. The method of claim 8 wherein the calculating the total cost of fraud comprises, for each transaction request in each sample:
- identifying, from a plurality of scenarios, one or more scenarios applicable to the acceptance flow applied to the transaction request;
- summing, for each of the one or more scenarios, a plurality of individual cost components for the scenario to produce a cost of fraud for the scenario;
- multiplying, for each of the one or more scenarios, the cost of fraud for the scenario by a probability that the transaction request is in the scenario to produce a weighted cost of fraud for the scenario; and
- summing the weighted costs of fraud of the one or more scenarios to produce the total cost of fraud for the transaction request.

14. The fraud management method of claim 13 wherein the individual cost components comprise at least one of a cost of reimbursing the transaction request if fraudulent, a chargeback cost of the transaction request if fraudulent, a cost of manual review, a cost of lost sales, a cost of performing payment authentications, a cost of fraud screenings, or a probability of the transaction request being fraudulent.

* * * * *